(12) United States Patent
Ganugapati

(10) Patent No.: US 9,779,149 B2
(45) Date of Patent: Oct. 3, 2017

(54) MULTI MODE EXTENDABLE OBJECT SELECTOR

(71) Applicant: VMware, Inc., Palo Alto, CA (US)

(72) Inventor: Anil Ganugapati, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 606 days.

(21) Appl. No.: 14/219,753

(22) Filed: Mar. 19, 2014

(65) Prior Publication Data

US 2015/0268837 A1  Sep. 24, 2015

(51) Int. Cl.
*G06F 17/30*  (2006.01)

(52) U.S. Cl.
CPC .............. *G06F 17/30572* (2013.01)

(58) Field of Classification Search
CPC ........... G06F 17/30572; G06F 3/04842; G06F 3/04847
See application file for complete search history.

(56) References Cited

U.S. PATENT DOCUMENTS

| | | | | |
|---|---|---|---|---|
| 5,760,770 A * | 6/1998 | Bliss | ............... | G06F 9/4443 704/7 |
| 5,926,177 A * | 7/1999 | Hatanaka | ............... | G06F 9/4443 345/420 |
| 7,478,107 B1 * | 1/2009 | Yehuda | ............... | G06F 3/0605 |
| 2003/0028892 A1 * | 2/2003 | Gewickey | ............... | H04N 21/23614 725/110 |
| 2005/0268301 A1 * | 12/2005 | Kelley | ............... | G06F 9/4843 718/100 |
| 2006/0017954 A1 * | 1/2006 | Ly | ............... | G06F 3/1207 358/1.13 |
| 2006/0080269 A1 * | 4/2006 | MacLaurin | ............... | G06F 9/4443 706/45 |
| 2007/0024594 A1 * | 2/2007 | Sakata | ............... | G06F 3/0488 345/173 |
| 2008/0307343 A1 * | 12/2008 | Robert | ............... | G06F 3/04817 715/765 |
| 2010/0050098 A1 * | 2/2010 | Turner | ............... | G06F 17/30038 715/763 |
| 2010/0070489 A1 * | 3/2010 | Aymeloglu | ............... | G06F 17/30554 707/722 |
| 2011/0125829 A1 * | 5/2011 | Finley | ............... | G06F 17/30867 709/203 |
| 2011/0145710 A1 * | 6/2011 | Albert | ............... | G06Q 10/06 715/734 |
| 2011/0276423 A1 * | 11/2011 | Davidson | ............... | G06Q 30/06 705/26.1 |
| 2012/0084681 A1 * | 4/2012 | Cassar | ............... | G06F 1/1616 715/761 |
| 2013/0018982 A1 * | 1/2013 | McConnell | ............... | G06F 17/30867 709/217 |

(Continued)

*Primary Examiner* — Andrea Long

(57) ABSTRACT

A object selector for supporting at least one selectable view is described. The object selector includes: a selectable view accessor configured for accessing a set of selectable views, wherein each selectable view of the set of selectable views is configured for displaying data associated with at least one selected item; an integrated selectable view renderer configured for rendering at least one integrated selectable view by integrating the at least one selected item into at least one selectable view of the set of selectable views; and an integrated selectable view displayer configured for displaying the at least one integrated selectable view.

12 Claims, 12 Drawing Sheets

(56) References Cited

U.S. PATENT DOCUMENTS

| | | | |
|---|---|---|---|
| 2013/0097555 A1* | 4/2013 | Marantz | G06F 17/30991 715/784 |
| 2014/0046934 A1* | 2/2014 | Zhou | G06F 17/30864 707/723 |
| 2014/0189564 A1* | 7/2014 | Ohno | G06F 3/04895 715/771 |
| 2015/0154717 A1* | 6/2015 | Stibel | G06Q 40/12 705/30 |

* cited by examiner

300

---

Access a set of selectable views, wherien each selectable view of the set of selectable views is configured for displaying data associated with at least one selected item of an application.
305

↓

Render at least one integrated selectable view, wherein the rendering includes integrating the at least one selected item into at least one selectable view of the set of selectable views.
310

↓

Display the at least one integrated selectable view.
315

↓

Validate the at least one selected item; and based on the validating, adjust invalid selected items appearing in the at least one integrated selectable view.
320

↓

Based on selection rules, determine a final selection of the at least one selected item.
325

↓

Indicate the final selection.
330

Access a set of selectable views for displaying data associated with at least one selected item of an application.
605

Validate the at least one selected item to achieve at least one validated selected item.
610

Integrate the at least one validated selected item into at least one selectable view of the set of selectable views to achieve at least one integrated selectable view.
615

Display the at least one integrated selectable view.
620

FIG. 6

MULTI MODE EXTENDABLE OBJECT SELECTOR

BACKGROUND

A user of an application may request information regarding a specific item in the application. Search queries are presented by the user and search results are displayed in response thereto. If a user wishes to learn more about the content of specific search results, the user may then further investigate by either "clicking" on an item within the search results or initiate a separate search. In this way, the user may obtain the desired information. However, in many situations, the conventional process of searching for information, and then drilling down into the discovered information via various clicks and/or new searches is time consuming and inefficient. Thus, there exist limitations to traditional search processes.

BRIEF DESCRIPTION OF THE DRAWINGS

Aspects of the present invention are illustrated by way of example, and not by way of limitation, in the accompanying drawings, wherein:

FIG. 3 is a flow diagram of a method 300 for presenting data within at least one selectable view, in accordance with an embodiment.

FIG. 6 is a flow diagram of a method 600 for presenting data within at least one selectable view, in accordance with an embodiment.

Figure 1:
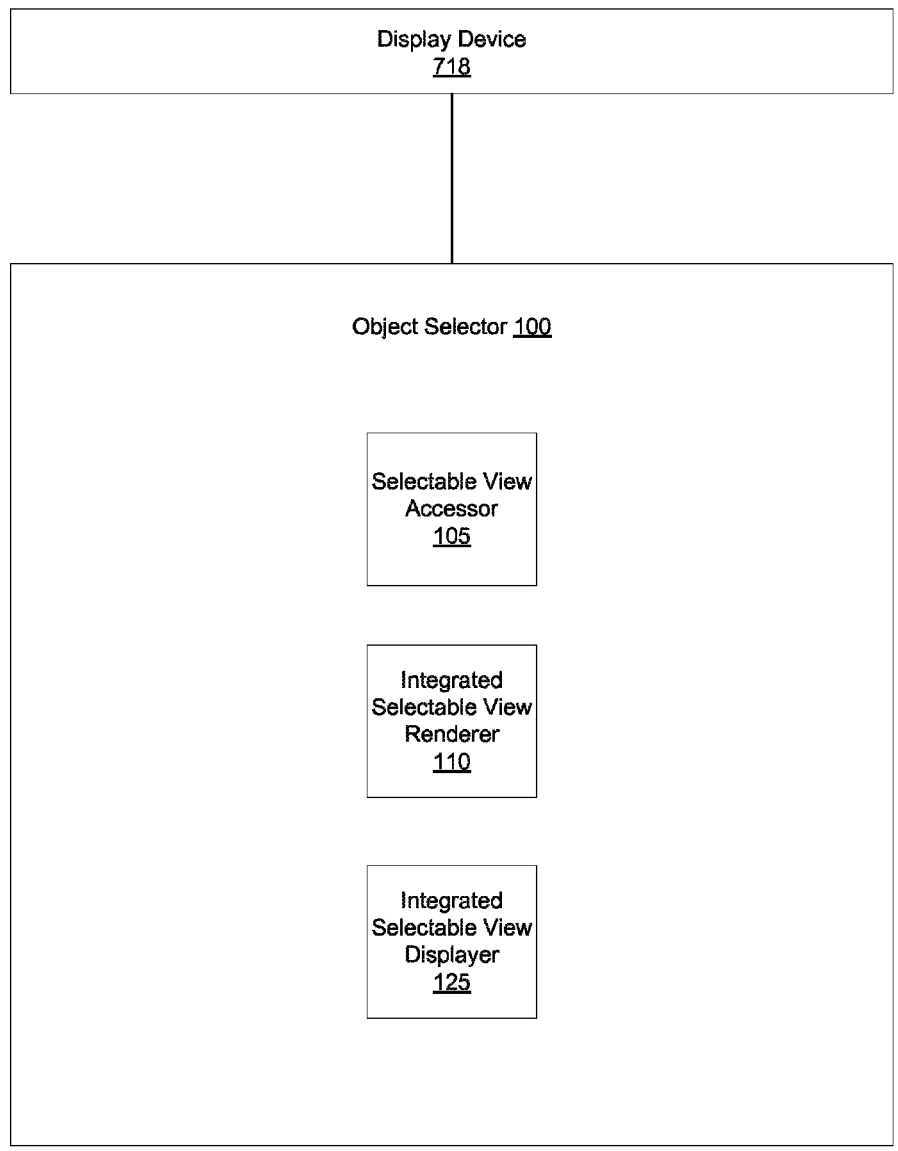
FIG. 1 is a block diagram of an example object selector for supporting at least one selectable view, in accordance with embodiments.

The drawings referred to in this description should be understood as not being drawn to scale except if specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accessing," "rendering", "validating", "removing", "adjusting", "displaying", "indicating", "receiving", "determining" or the like, often refer to the actions and processes of an electronic computing device (or portion thereof), module or system, such as, but not limited to, an object selector (See FIGS. 1, 2, 3 and 6) and a virtual machine. The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Discussion begins with a general description of various embodiments. The discussion continues with a description of an example object selector for supporting at least one selectable view, in accordance with embodiments. The discussion turns to a description of example methods of operation for supporting at least one selectable view, in accordance with embodiments. Following, the discussion concludes with a description of an example computer system upon which the example object selector and example methods operate.

Various embodiments of the present invention provide for a method for presenting data (e.g., "inventory") within at least one selectable view (e.g., a list view; a map view; a tree view; a histogram view; a hierarchical view) and for providing to a user multiple views for selection. For instance, after a data request is made in an application (e.g., web-based application, application software other than for a web-based application), embodiments present various selectable viewing choices to the user for viewing the data.

Some embodiments provide selectable viewing choices for displaying the search results that are predetermined (e.g., preprogrammed) to be the most appropriate for that particular search request. For example, it may be predetermined that a response to a user's query within an accounting application will include a list view, while a response to a user's query within a mapping application is predetermined to include a map view. Thus, known data associated with a user's query (e.g., query content, application content) is used to intelligently organize the search results into a particular selectable view (e.g., tree view) and provide this view to a user as a selection choice.

Further, some embodiments track the user's search queries and a user's selection of search results that are displayed within a set of selectable views. Based on the user's tracked search and item selection history, some embodiments continuously and automatically customized the search results for the user in response to any future search queries. Thus, if a user spends time searching for information, takes a break, and later resumes the search, embodiments "remember" the user's search and the user's "final selection" of selectable choices determined in accordance with selection rules, as will be described herein.

Thus, embodiments provide multiple modes of inventory (e.g., data, content) access so that the user can choose between the various selectable viewing modes to find the mode that is the most appropriate for the situation. In one embodiment, the user may choose which view in which he would like to have inventory presented. In further embodiments, data is presented to the user in views that are predetermined to be the most appropriate based on monitoring the interaction between the user and the application(s).

Example Object Selector for Supporting at Least One Selectable View

Figure 2:
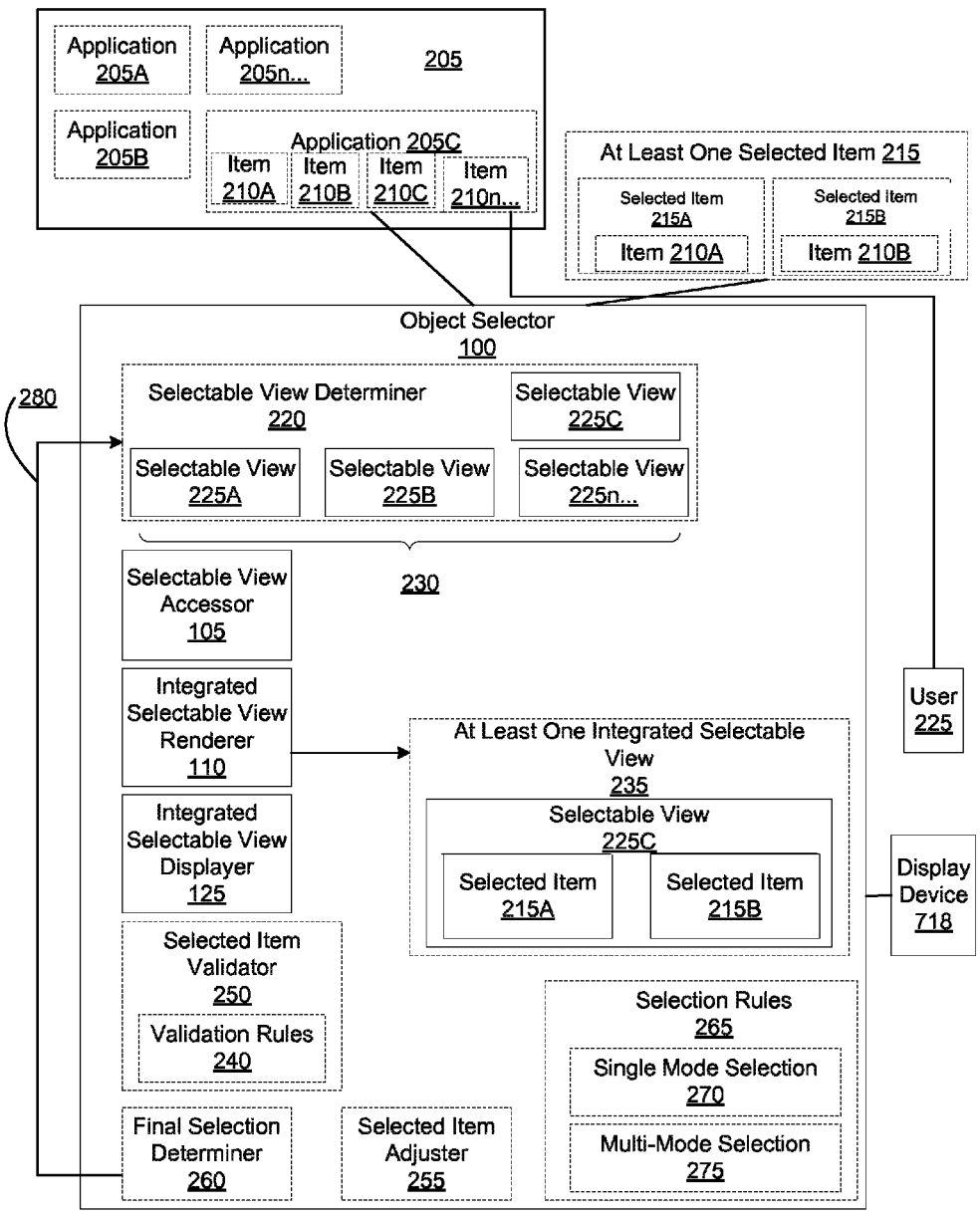
FIG. 2 is a block diagram of an example object selector for supporting at least one selectable view, in accordance with embodiments.

FIGS. 1 and 2 are block diagrams of an example object selector 100 for supporting at least one selectable view, in accordance with embodiments. With reference to FIG. 1, in embodiments, and as will be described below, the object selector 100 includes: selectable view accessor 105; integrated selectable view renderer 110; and integrated selectable view displayer 125. Further and with reference to FIGS. 1 and 2, in various embodiments, and as will be described herein, the object selector 100 includes any of the following: a selectable view determiner 220; a selected item validator 250; a selected item adjuster 255; and a final selection determiner 260. The object selector 100 is coupled with an example computer 700. The computer 700 will be described herein with reference to FIG. 7 below.

In one embodiment, the selectable view accessor accesses a set of selectable views. For example, the selectable view accessor 105 accesses the set of selectable views 230, such as selectable views 225A, 225B, 225C and 225n . . . (hereinafter, selectable views 225, unless specifically noted otherwise). It should be appreciated that the set of selectable views 230 may be one or more selectable views. In various embodiments, the selectable views 225 may be, but are not limited to being, any of the following types of views: a list view; a tree view; a map view; a histogram view; a hierarchical view; a virtual diagram). The language "selectable view" refers to a type of view enabled to be selected, wherein the selection is performed in any of the following non-limiting ways for any type of view: using a mouse and cursor to click on an icon representing the view; touching with an input (e.g., finger, stylus, etc.) an icon or other representation of the view; and speaking "XXX view", such as, but not limited to, "list view".

Each of the selectable views of the set of selectable views is configured for displaying data associated with at least one selected item. For example, and with continued reference to FIGS. 1 and 2, in one embodiment, the computer 700 includes object selector 100 and applications 205A, 205B, 205C and 205n . . . (hereinafter, application 205, unless specifically noted otherwise).

In one example, assume that the application 205C is an accounting application. Application 205C includes items 210A (accounts payable), 210B (accounts receivable, 210C (employee salaries) and 210n . . . (other topics relating to accounting) (hereinafter, items 210, unless specifically noted otherwise). Since the user 225 desires to review the accounts payable and accounts receivable for his business, the user 225 then selects items 210A (accounts payable) and 210B (accounts receivable). The object selector 100 recognizes these items 210A and 210B as "selected items" 215A and 215B, respectively. The "data" that is associated with the selected items 215A and 215B is, for example but not limited to such, the names, contact information and dollar amount payable and receivable from and to the user 225, respectively.

The selectable view accessor 105 accesses the set of selectable views 230 (e.g., selectable views 225A, 225B 225C and 225n . . . [hereinafter, selectable views 225, unless specifically noted otherwise]) that have been determined to be the views that will display the selected items 215A and 215B (accounts payable and accounts receivable, respectively). In one embodiment, a user 225 requests that the selected items 215A and 215B be displayed in both a list view and a histogram view. Thus, in one embodiment and in such a manner, the user 225 determines the views that will display the selected items, such as selected items 215A and 215B.

However, in another embodiment, the object selector 100 also includes the selectable view determiner 220, which determines potential selectable views based on the type and content of the application and the type and content of the items selected by the user. For example, and continuing with the accounting example, the selectable view determiner 220 is preprogrammed to determine that the request for displaying content from an accounting application (accounts payable and the accounts receivable information relating to the user's business) would best be displayed to the user with a list view and/or a histogram view. (A map view and a tree view are predetermined not to be useful to the user in this situation.) Therefore, the object selector ultimately presents to the user 225 the selection choices of a list view and a histogram.

The integrated selectable view renderer renders at least one integrated selectable view by integrating the at least one selected item into at least one selectable view of the set of selectable views. For example, and again with reference to FIGS. 1 and 2, in one embodiment, the integrated selectable view renderer 110 integrates the at least one selected items 215A and 215B into at least one selectable view 225C of the set of selectable views 230 to achieve the at least one integrated selectable view 235. For instance, and continuing with the accounting example, the integrated selectable view renderer 110 organizes the information associated with the selected items, the accounts payable (215A) and the accounts receivable 215B), such that this information may be displayed in a list view and a histogram view as requested by the user 225 and/or as determined by the selectable view determiner 220.

The integrated selectable view displayer displays the at least one integrated selectable view. For example, the integrated selectable view displayer 125 presents on a display device 718 (See FIG. 7) a list view and/or a histogram view of the accounts payable and/or the accounts receivable (thereby displaying the at least one item that was selected in various view forms). In another embodiment, the integrated selectable view displayer 125 presents on the display device 718 icons in the shape of a "tab" and that represent a list view and a histogram view. The user 125 may "click" on one or both of the tabs to view the list view and the histogram view independently or simultaneously.

In one embodiment, the selected item validator validates the at least one selected item. For example, the selected item validator 250 determines if information associated with any selected item has changed and/or is no longer valid. For instance, and continuing with the accounting example, on Monday, the user 225 views the accounts payable in the list view. On Tuesday, the user 225 pays rent to the landlord of the building in which his business is headquartered. Then, on Wednesday, the user 225 again seeks to view the accounts payable in the list view. The selected item validator 250 will determine if any information regarding the accounts payable has changed since Monday, the day that the last integrated selectable view 235 was displayed to the user 225. Since the user 225 paid rent to his landlord on Wednesday, this item should no longer appear on the accounts payable list. The selected item validator 250 will determine that this entry to the accounts payable list is invalid.

In one embodiment, based on the validating performed by the selected item validator 250, the selected item adjuster 255 adjusts invalid selected items appearing in the at least one integrated selectable view 235. For instance, and continuing with the accounting example, since the selected item validator 250 found that the entry regarding rental payment to the landlord was invalid, the selected item adjuster 255 adjusts this invalid entry by removing it from the at least one integrated selectable view 235. In other embodiments, an item may be found to be invalid because information associated with the item has changed in ways other than through its ceasing to exist. In these situations, the selected item adjuster 255 will adjust the selected item appearing in the at least one integrated selectable view 235. For example, the selected item adjuster 255 may adjust things such as, but not limited to, the following: increasing the square footage of a house; decreasing an amount owed to a creditor; and increasing a number of virtual machines in a datacenter.

In one embodiment, the final selection determiner 260 determines a final selection 280 of the at least one selected item 215 based on selection rules 265. This final selection 280, once determined, may be indicated in any number of ways that are capable of conveying the message that a particular content of the final selection 280 is different from surrounding content. For example, the content associated with the final selection may be highlighted, underlined, bold-faced, italicized, appear with an asterisk next to it, etc. The selection rules 265, upon which the final selection is based, operate according to either a single selection mode 270 or a multi-selection mode 275.

In one embodiment and as will be explained in more detail in the Example Methods of Operation section below with regard to an example operation involving searching for a vacation rental, if embodiments are in the single selection mode 270, then the following selection rules 265 apply, given that the integrated selectable view displayer 125 displays at least one selected item (thereby achieving at least one displayed item): 1) if a first item, of the at least one displayed item, is selected from a first selectable view of the set of selectable views, and if a second item, of the at least one displayed item, is selected from a second selectable view of the set of selectable views, then the second item is determined to be the at least one selected item, in relation to which the selectable view accessor 105 accesses the set of selectable views; and 2) if a first item, of the at least one displayed item, is selected from a first selectable view of the set of selectable views, and if the first item is also selected from a second selectable view of the set of selectable views, then the first item selected from the second selectable view is determined to be the at least one selected item, in relation to which the selectable view accessor 105 accesses the set of selectable views.

In one embodiment and as will be explained in more detail in the Example Methods of Operation section below with regard to an example operation involving searching for a vacation rental, if embodiments are in the multi-selection mode 275, then the following selection rules 265 apply, given that the integrated selectable view displayer 125 displays at least one selected item (thereby achieving at least one displayed item): 1) if a first item, of the at least one displayed item, is selected from a first selectable view of the set of selectable views, and if a second item, of the at least one displayed item, is selected from a second selectable view of the set of selectable views, then the first item selected from the first selectable view and the second item selected from the second selectable view are is determined to be the at least one selected item, in relation to which the selectable view accessor 105 accesses the set of selectable views; and 2) if a first item, of the at least one displayed item, is selected from a first selectable view of the set of selectable views, if a second item, of the at least one displayed item, is selected from a second selectable view of the set of selectable views, and if the first item and a third item, of the at least one displayed item, are selected from a third selectable view of the set of selectable views, then the first item selected from the third selectable view, the second item selected from the second selectable view and the third item selected from the third selectable view are determined to be the at least one selected item, in relation to which the selectable view accessor 105 accesses the set of selectable views.

Example Methods of Operation

The following discussion sets forth in detail some example methods of operation of embodiments. With reference to FIGS. 3 and 6, flow diagrams of methods 300 and 600, illustrate example procedures used by various embodiments. Methods 300 and 600 include some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in methods 300 and 600, such procedures are examples. That is, embodiments are well suited to performing various other procedures or variations of the procedures recited in methods 300 and 600, alone or in combination. Likewise, in some embodiments, the procedures in methods 300 and 600, alone or in combination, may be performed in an order different than presented and/or not all of the procedures described in one or more of these flow diagrams may be performed. It is further appreciated that procedures described in methods 300 and 600, alone or in combination, may be implemented in hardware, or a combination of hardware with firmware and/or software.

FIG. 3 is a flow diagram of a method 300 for presenting data within at least one selectable view, in accordance with an embodiment. Although specific procedures are disclosed in method 300, embodiments are well suited to performing various other procedures or variations of the procedures recited in method 300. It is appreciated that the procedures in method 300 may be performed in an order different than presented, that not all of the procedures in method 300 may be performed, and that additional procedures to those illustrated and described may be performed. All of, or a portion of, the procedures described by method 300 can be implemented by a processor or computer system executing instructions which reside, for example, on computer-usable/readable media. The following discussion of method 300 references FIGS. 1, 2 and 3 unless specifically noted otherwise. Further, method 300 will be explained in terms of the following examples: searching a datacenter to find a virtual machine residing on a particular host and that needs to be powered ON; and executing a search for a vacation rental.

At step 305 of method 300, in one embodiment and as described herein, a set of selectable views 230 is accessed, wherein each selectable view 225 of said set of selectable views 230 displays data associated with at least one selected item 215 of an application. In one embodiment, the accessing at step 305 includes the selection rules 265 described above, according to the single selection mode 270 and the multi-mode selection 275.

At step 310 of method 300, in one embodiment and as described herein, at least one integrated selectable view 235 is rendered, wherein the rendering comprises integrating the at least one selected item, such as selected items 215A and 215B, into at least one selectable view, such as selectable view 225C of the set of selectable views 230.

At step 315 of method 300, in one embodiment and as described herein, the at least one integrated selectable view 235 is displayed, on for example, the display device 718.

At step 320 of method 300, in one embodiment and as described herein, the at least one selected item 215 is validated, and based on this validating, the invalid selected items appearing in the at least one integrated selectable view 235 are adjusted. As described herein, this adjustment may include removing the invalid item or adjusting the content of the invalid item to avoid the invalidity determination.

At step 325 of method 300, in one embodiment and as described herein, based on the selection rules 265, a final selection 280 of the at least one selected item 215 is determined. In one embodiment and as described herein, the step 330 of method 300, includes the determining of a final selection 280 of step 325 and the indicating of the final selection 280.

Various embodiments permit the user to input various constraints upon the retrieval of data, thus affecting the selectable views presented to the user for integrating with selected items. The constraint inputs are context specific, in many instances. For example, while shopping on-line, the user may input size and price constraints in addition to a standard search query. As a result, at least some embodiments provide the user with selectable views based on the constraint inputs rather than the context of the application. Thus, the user is able to override a predetermined (e.g., a preprogrammed) pattern of responding to a search query with a particular type of selectable view.

Example—Discovering a Virtual Machine of a Data Center for Powering ON

Figure 4A:
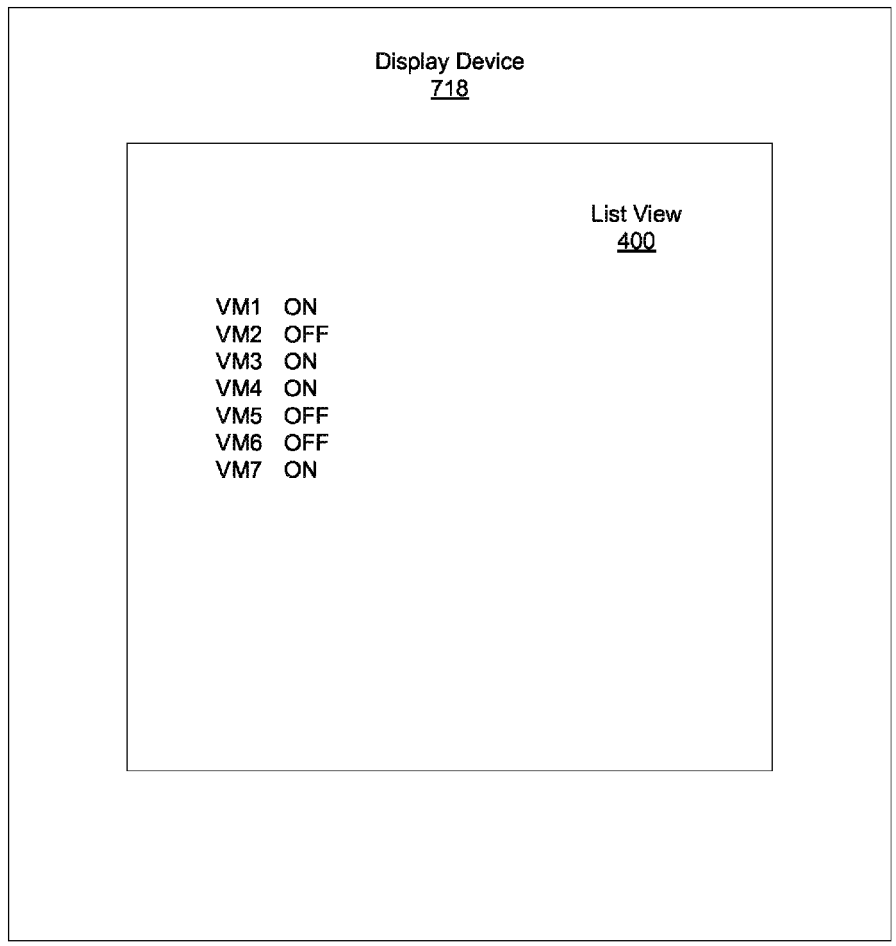
FIG. 4A illustrates a conventional list view of virtual machines displayed on the display device.

The following is a non-limiting example of an embodiment in operation, in accordance with method 300. With reference to FIG. 4A, a list view 400 of virtual machines ("VM(s)") displayed on the display device 718, is shown. The user's desire is for all VMs of the host machine 2 ("$H_2$") to be powered ON. The user queries the application for a list of the ON/OFF status of all VMs, and the following list view 400 is displayed to the user. From this list view, it can be seen that $VM_1$, $VM_2$, $VM_4$ and $VM_7$ are powered ON, and $VM_2$, $VM_5$ and $VM_6$ are powered OFF. With respect to conventional technology, it cannot be determined from this view in FIG. 4A which VMs are hosted by $H_2$. In order to determine this, the user must make further search efforts, such as drilling down into the VMs that are shown as OFF to determine if these VMs are hosted by $H_2$. In the alternative, the user may perform a new search by requesting a list of VMs and each's respective power status connected to $H_2$.

Figure 4B:
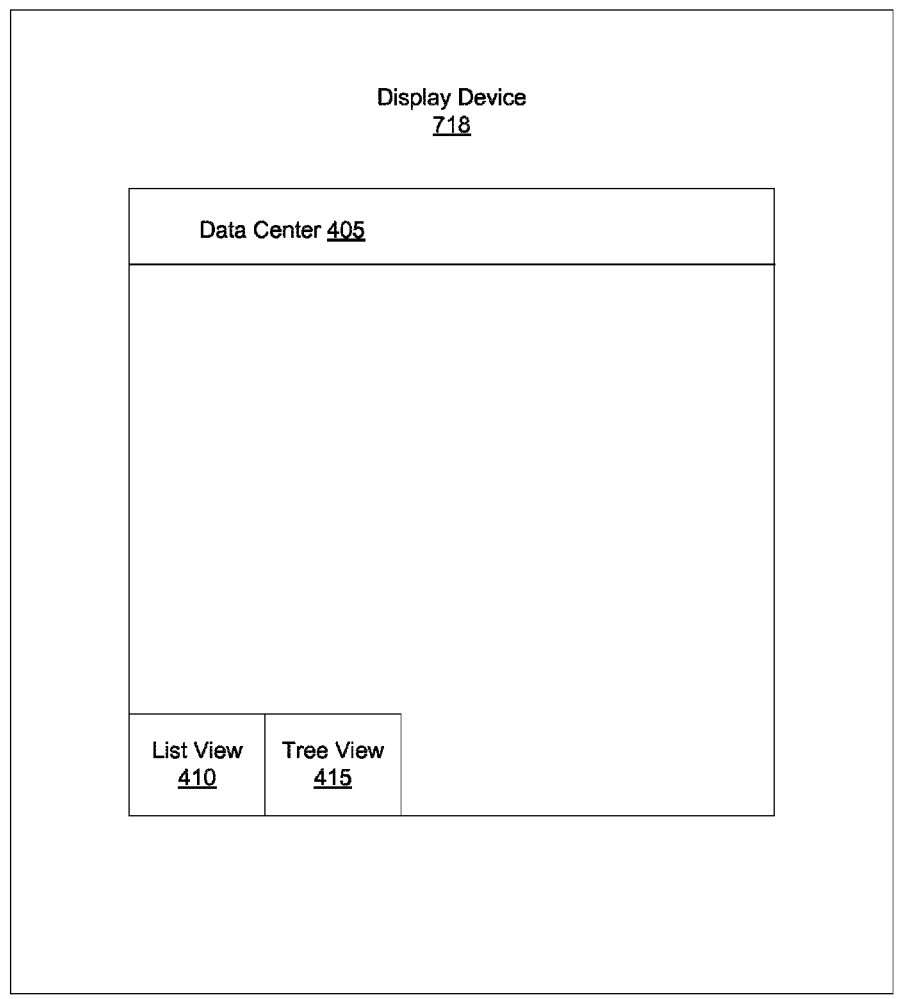
FIG. 4B illustrates a potential selected item, "Data Center", and selectable views, "List View" and "Tree View" in tab form, in accordance with an embodiment.

With reference to FIG. 4B, a potential selected item, "Data Center" 405, and selectable views, "List View" 410 and "Tree View" 415 in tab form, are shown, in accordance with an embodiment. It should be appreciated that in one embodiment, the List View 410 and the Tree View 415 are presented as selection choices because these were the selectable views that were determined, via preprogramming, to be the most useful or the most desired by the user. However, in another embodiment, the user requested that the List View 410 and the Tree View 415 be available as selectable options. In this example, the user selects the Data Center 405 as the selected item and the tree view 415 as the selectable view into which the content associated with the Data Center 405 is to be integrated and ultimately displayed.

Figure 4C:
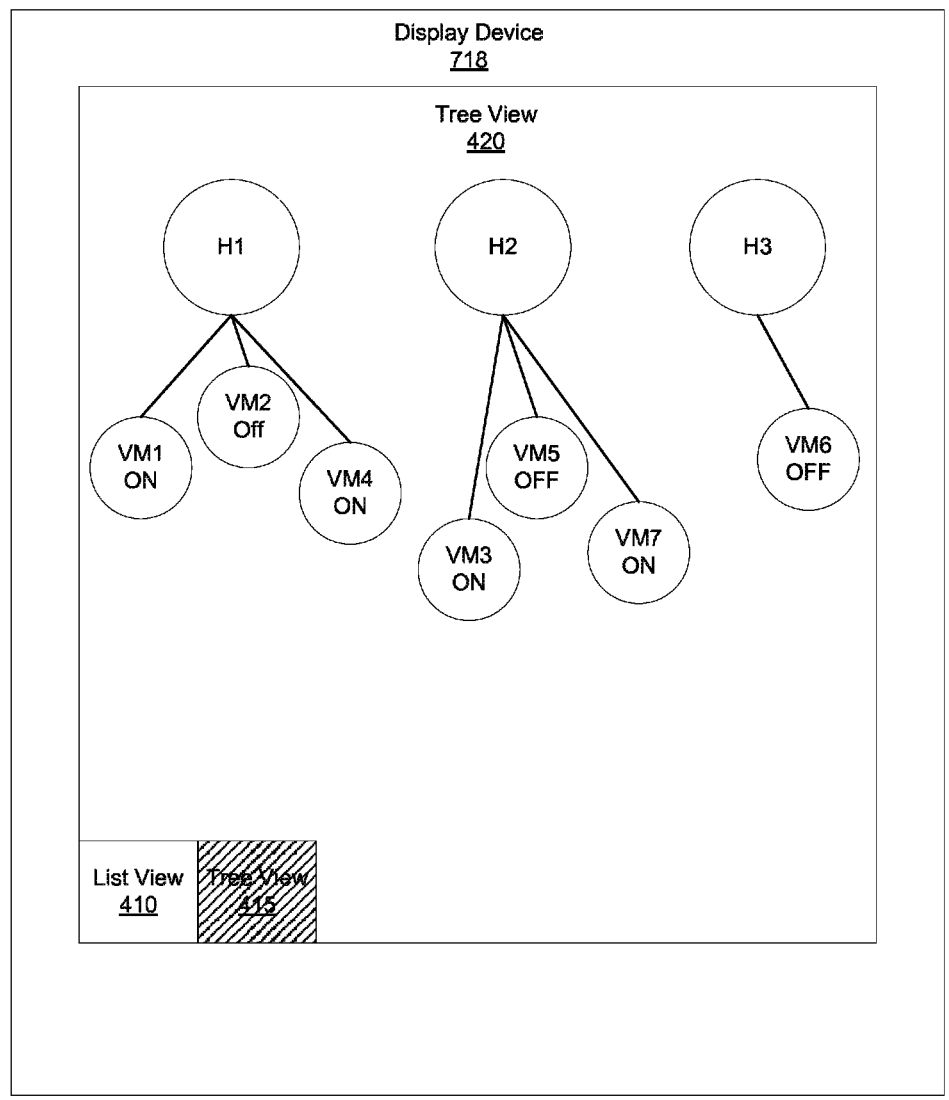
FIG. 4C illustrates a tree view of the contents of a data center, in accordance with an embodiment.

FIG. 4C shows the contents of the Data Center 405 displayed in a tree view 420, in accordance with an embodiment. The tree view 420 of the Data Center 405 includes hosts, $H_1$, $H_2$ and $H_3$, in accordance with an embodiment. As shown, $VM_1$ (ON), $VM_2$ (OFF) and $VM_4$ (ON) reside at $H_1$. The $VM_3$ (ON), $VM_5$ (OFF) and $VM_7$ (ON) reside at $H_2$. The $VM_6$ (OFF) resides at $H_3$. Thus, it can be quickly seen from the tree view 420 presented on the display device 718 that $H_2$ hosts the $VM_5$ and that the $VM_5$ is powered OFF. It can also be seen that the user's need to discover which VMs of $H_2$ are powered OFF in order to fulfill the objective of powering ON all VMs residing on $H_2$ can be most quickly accomplished with embodiments providing a tree view 420 than using the conventional methods of performing multiple searches.

Example—Executing a Search for a Vacation Rental

Figure 5A:
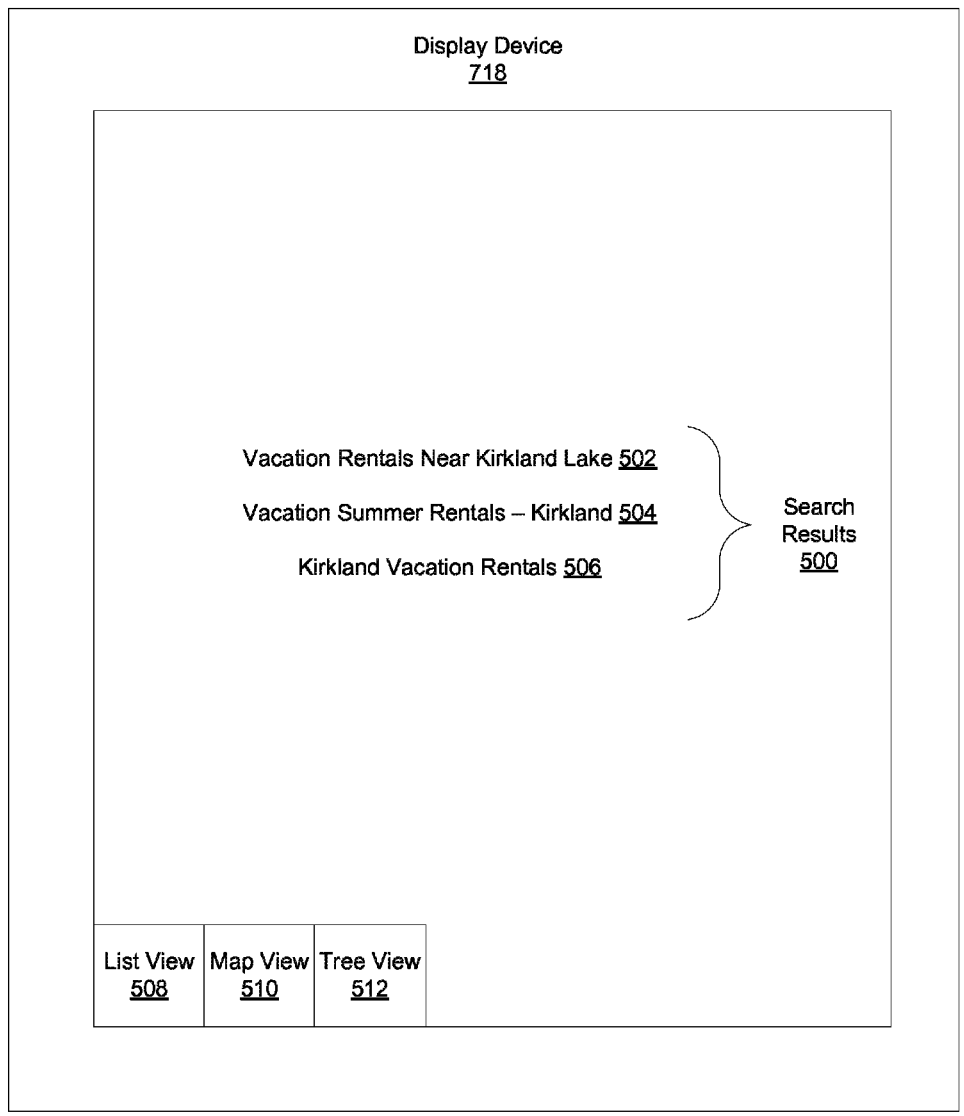
FIG. 5A illustrates the results of a search performed for lake-front vacation rental property and selectable view choices presented on the display screen, in accordance with an embodiment.

The following is a non-limiting example of an embodiment in operation, in accordance with method 300. FIG. 5A illustrates the results of a search performed for lake-front vacation rental property and selectable view choices presented on the display device 718, in accordance with an embodiment. In this example, Bob is planning a week-long summer vacation trip to the Kirkland Lake area and wishes to stay in a cabin near the water's edge. Bob employs the following criteria for a computer search (in a computer application) for the perfect vacation rental: two or more bedrooms; two or more bathrooms; at least fifteen hundred square feet; less than $2,000 for the week; and near the water. Bob receives the following search results 500: "Vacation Rentals Near Kirkland Lake" 502; "Vacation Summer Rentals—Kirkland" 504; and "Kirkland Vacation Rental" 506. Embodiments present various choices for viewing details of the search results 500. For example, embodiments offer a List View 508, a Map View 510, and a Tree View 512 of the search results 500, in tab/icon form. The list view 514

(See FIG. 5B) shows a list of all available vacation rentals that match Bob's search request. The map view 516 (See FIG. 5C) shows all available vacation rentals in the Kirkland Lake area overlaid onto a map of the Kirkland Lake area, which match Bob's search request.

Figure 5B:
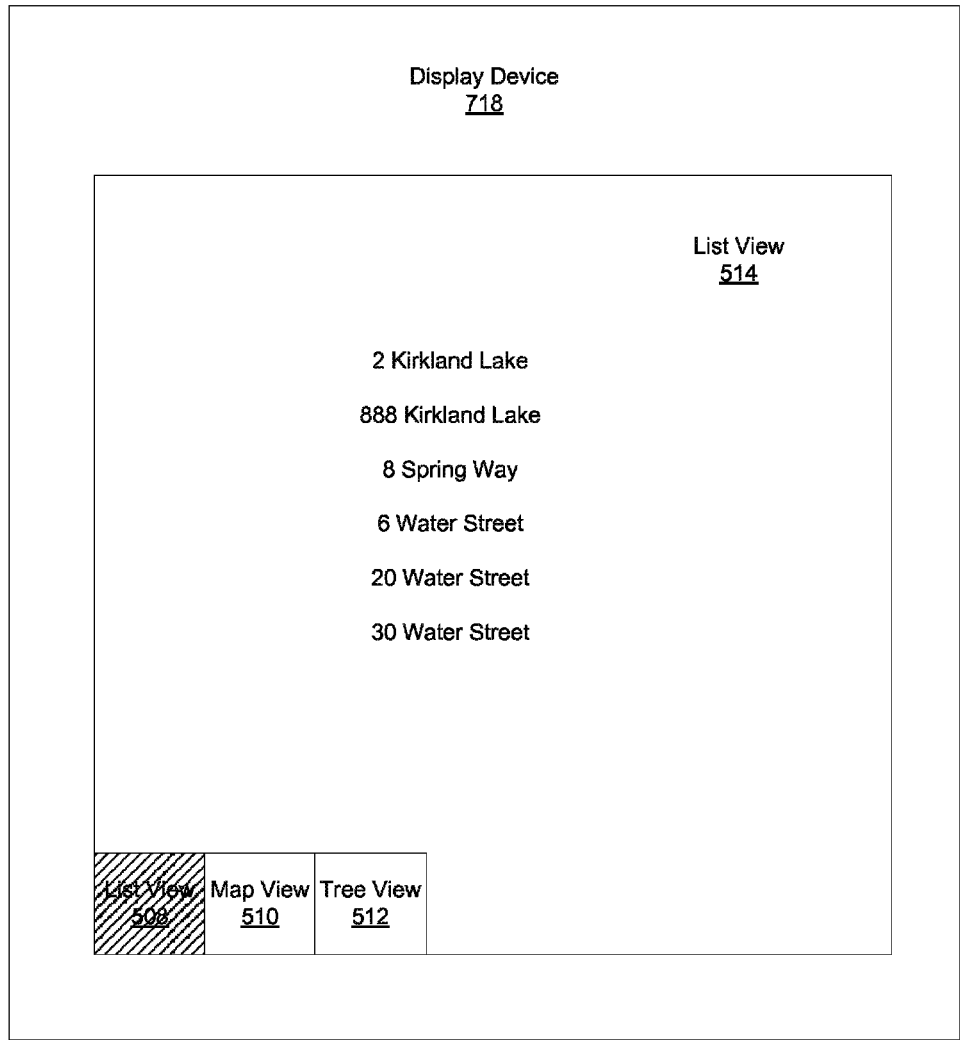
FIG. 5B illustrates the list view provided to Bob via the display device 618, in accordance with an embodiment.

Bob "clicks" on the List View 508 tab to select the list view 514 in order to quickly determine how many vacation rentals are available. FIG. 5B illustrates the list view 514 provided to Bob via the display device 718, in accordance with an embodiment. The list view 514 shows a list of the following addresses: 2 Kirkland Lake; 888 Kirkland Lake; 8 Spring Way; 6 Water Street; 20 Water Street; and 30 Water Street. Upon viewing the list view 514, Bob becomes interested in the second item listed and represented by a selectable icon, as its address is "888 Kirkland Lake" and Bob is looking for a lake-front property to rent. Upon clicking on the icon representing 888 Kirkland Lake, information about this property is displayed on the display device 718. Even though the address of the vacation rental appears to indicate that the vacation rental is near to Kirkland Lake, Bob sees that the vacation rental is actually 1 mile away from Lake Tahoe.

Figure 5C:
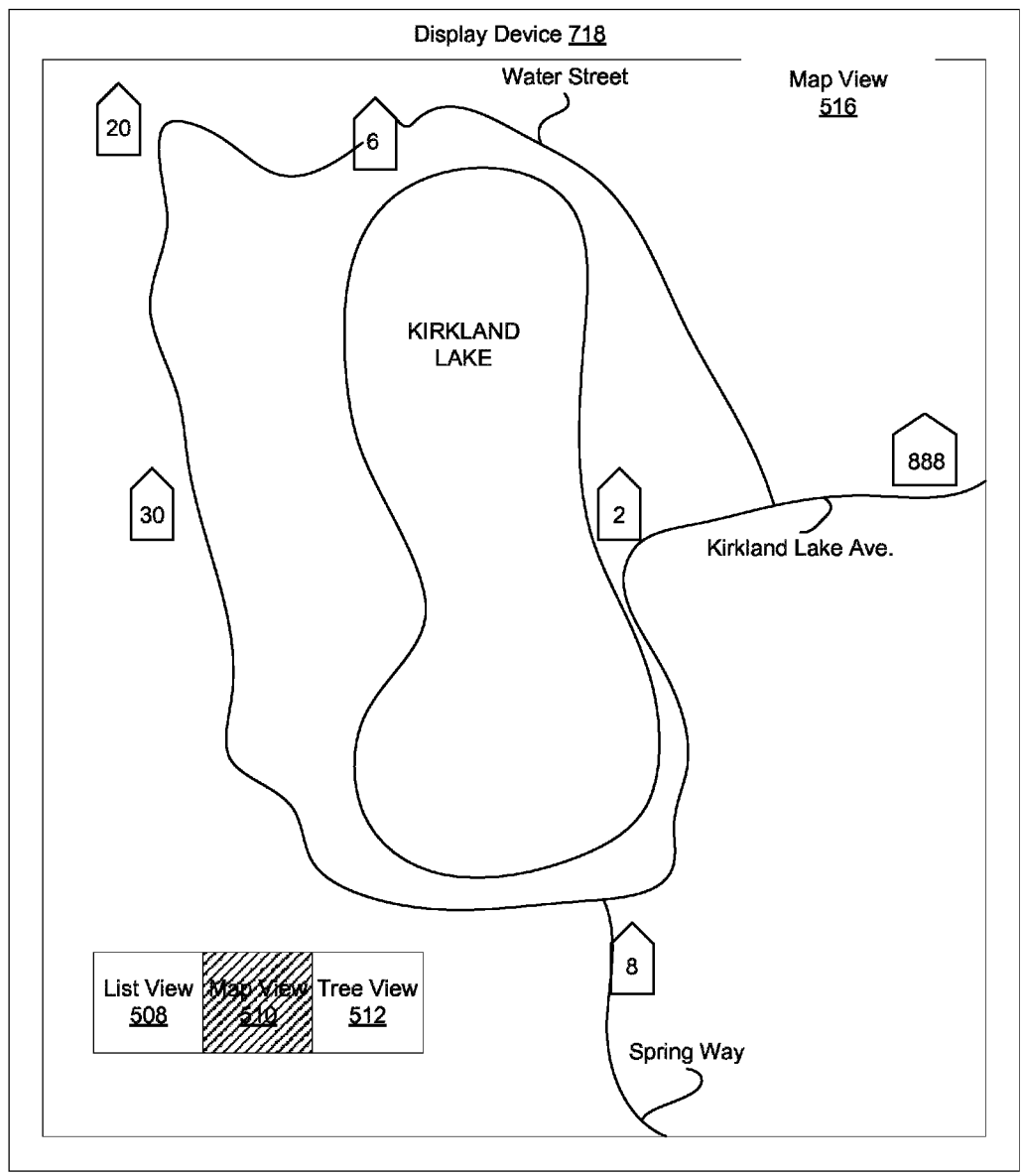
FIG. 5C illustrates the map view provided to Bob via the display device, in accordance with an embodiment.

Bob thinks that the map view might be better at providing information regarding vacation rentals close to Kirkland Lake. Bob clicks on the Map View 510 tab to see which rental property is the closest to the water. FIG. 5C illustrates the map view 516 provided to Bob via the display device 618, in accordance with an embodiment. From this map view 516, Bob is able to determine which vacation rentals are closest to Kirkland Lake. Upon clicking on the icon representing a property that appears to be fronting Kirkland Lake, information about this property is displayed. This lake-front vacation rental has the address of "2 Kirkland Lake Avenue".

However, at this point in time, Bob realizes that he must stop his vacation rental research because he has an appointment to attend. Bob signs out of the computer application. Later that evening, Bob signs back into the application and resumes his search. In the "single selection mode", embodiments will present to Bob, in response to Bob's resumed search requests, Bob's latest search results, that of data associated with the address, "2 Kirkland Lake Avenue" or a selectable icon representing such address.

In the "multi selection mode", in response to Bob's search request, embodiments present to Bob in accessible form, Bob's latest search results, that of data associated with either previously selected views (i.e., list view 514, map view 516), that of the address associated with the list view 514 (888 Kirkland Lake Avenue) and the address associated with the map view 516 (2 Kirkland Lake Avenue).

However, when in the "single selection mode", if during Bob's initial search Bob had selected the address 2 Kirkland Lake Avenue in the list view 514, and had also selected the address 2 Kirkland Lake Avenue in the map view 516, then in response to Bob's resumed search request, embodiments will present to Bob in an accessible form the address of 2 Kirkland Lake Avenue in the map view 516.

Figure 5D:
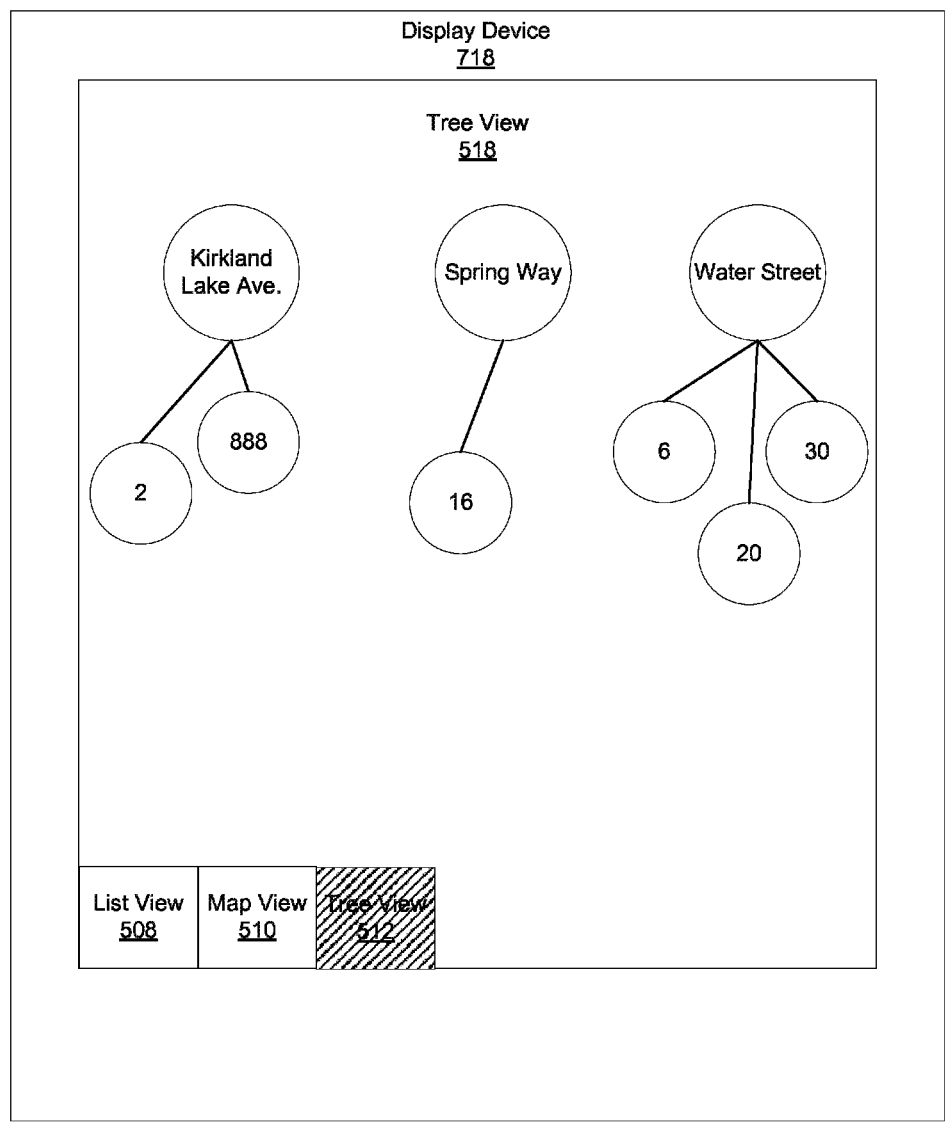
FIG. 5D illustrates the tree view provided to Bob via the display device, in accordance with an embodiment.

Now, assume that during Bob's initial search, Bob was presented a selectable tree view 518 of the vacation rentals available in the area via a Tree View 512 tab, of which Bob selected such tree view. FIG. 5D illustrates the tree view 518 provided to Bob via the display device 718, in accordance with an embodiment. While viewing the tree view 518 of available vacation rentals, Bob selected both 888 Kirkland Lake Avenue as well as 6 Water Street. While in the "multi-selection mode", when Bob resumes his rental property search, embodiments will present to Bob in accessible form, 888 Kirkland Lake Avenue in the tree view 518, 2 Kirkland Lake Avenue in the map view 516 and 6 Water Street in the tree view 518. In this version of events, in the multi-selection mode, when the same item is picked from different views, then the item selected in both views is shown in the view in which it was last selected.

FIG. 6 is a flow diagram of a method 600 for presenting data within at least one selectable view, in accordance with an embodiment. Although specific procedures are disclosed in method 600, embodiments are well suited to performing various other procedures or variations of the procedures recited in method 600. It is appreciated that the procedures in method 600 may be performed in an order different than presented, that not all of the procedures in method 600 may be performed, and that additional procedures to those illustrated and described may be performed. All of, or a portion of, the procedures described by method 600 can be implemented by a processor or computer system executing instructions which reside, for example, on computer-usable/readable media. The following discussion of method 600 references FIGS. 1, 2 and 6 unless specifically noted otherwise.

At step 605 of method 600, in one embodiment and as described herein, a set of selectable views 230 for displaying data associated with at least one selected item 215 of an application is accessed. In various embodiments and as described herein, the accessing performed at step 605 includes determining, according to selection rules 265, the at least one selected item to be integrated into a selectable view.

At step 610, in one embodiment and as described herein, the at least one selected item 215 is validated, to achieve at least one validated selected item. According to the method 600, the validating of the at least one selected item 215 occurs before the integration of the at least one selected item into a selectable view.

At step 615, in one embodiment and as described herein, the at least one validated selected item is integrated into the at least one selectable view of said set of selectable views 230 to achieve the at least one integrated selectable view 235.

At step 620, in one embodiment and as described herein, the at least one integrated selectable view 235 is displayed, for example, on the display device 718.

It should be appreciated that the functioning of embodiments may co-exist with the functioning of traditional methods of selecting objects from an inventory of data. If a user prefers the traditional method of searching for data, and then performing several refining steps to find the ideal search result, then the user is still able to do this. When the user wants to switch to using embodiments, the user will, in one embodiment and as described herein, click on one or more icons representing various selectable views.

It should further be appreciated that it is assumed that embodiments have access to enough metadata relating to selected items to enable embodiments to select for the user the most appropriate view for the situation.

Example Computer System Environment

Figure 7:
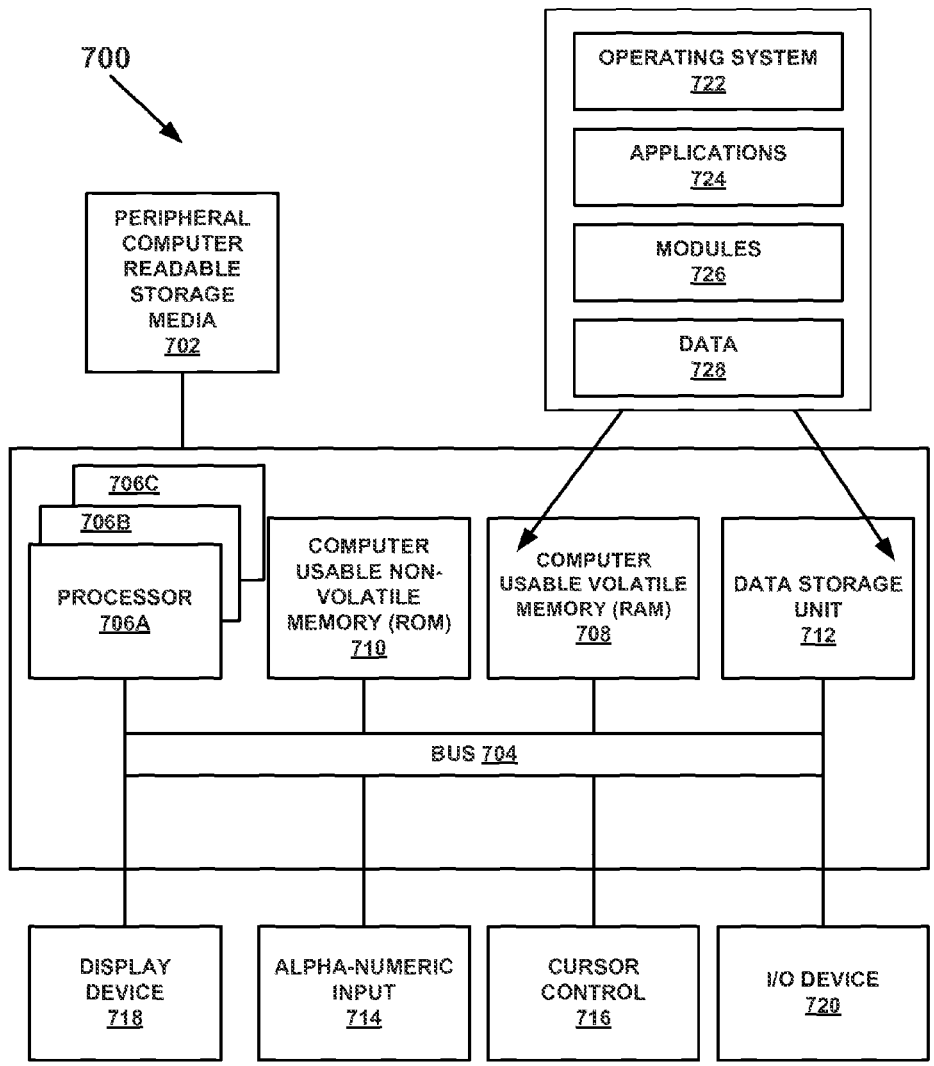
FIG. 7 is a block diagram of an example computer system with which or upon which various embodiments of the present invention may be implemented.

With reference now to FIG. 7, all or portions of some embodiments described herein are composed of computer-readable and computer-executable instructions that reside, for example, in computer-usable/computer-readable storage media of a computer system. That is, FIG. 7 illustrates one example of a type of computer (computer system 700) that can be used in accordance with or to implement various embodiments which are discussed herein. It is appreciated that computer system 700 of FIG. 7 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 700 of FIG. 7 is well adapted to having peripheral non-transitory computer-readable storage media 702 such as, for example, a floppy disk, a compact disc, digital versatile disc, other disc based storage, universal serial bus "thumb" drive, removable memory card, and the like coupled thereto.

System 700 of FIG. 7 includes an address/data bus 704 for communicating information, and a processor 706A coupled with bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g., random access memory (RAM), coupled with bus 704 for storing information and instructions for processors 706A, 706B, and 706C.

System 700 also includes computer usable non-volatile memory 710, e.g., read only memory (ROM), coupled with bus 704 for storing static information and instructions for processors 706A, 706B, and 706C. Also present in system 700 is a data storage unit 712 (e.g., a magnetic or optical disk and disk drive) coupled with bus 704 for storing information and instructions. System 700 also includes an optional alphanumeric input device 714 including alphanumeric and function keys coupled with bus 704 for communicating information and command selections to processor 706A or processors 706A, 706B, and 706C. System 700 also includes an optional cursor control device 716 coupled with bus 704 for communicating user input information and command selections to processor 706A or processors 706A, 706B, and 706C. In one embodiment, system 700 also includes an optional display device 718 coupled with bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands.

System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A non-transitory computer-readable storage medium having instructions embodied therein, that when executed, cause a computer system to perform a method for presenting data within at least one selectable view, said method comprising:
   accessing a set of selectable views, wherein each selectable view of said set of selectable views is configured for displaying data associated with at least one selected item of an application;
   rendering at least one integrated selectable view, wherein said rendering comprises integrating said at least one selected item into at least one selectable view of said set of selectable views;
   displaying said at least one integrated selectable view in response to an initial portion of a search, wherein said displaying said at least one integrated selectable view comprises displaying at least one selected item to achieve at least one displayed item, and wherein said accessing, in a single selection mode, comprises:
      when a first item, of said at least one displayed item, is selected from a first selectable view of said set of selectable views; and
      when a second item, of said at least one displayed item, is selected from a second selectable view of said set of selectable views; then determining that said second item is said at least one selected item; and
   after said initial portion of said search is terminated, and in response to a resumed portion of said search displaying said second item in said second selectable view.

2. The non-transitory computer-readable storage medium of claim 1, wherein said method further comprises:
   validating said at least one selected item; and
   based on said validating, adjusting invalid selected items appearing in said at least one integrated selectable view.

3. The non-transitory computer-readable storage medium of claim 1, wherein said method further comprises:
   based on selection rules; determining a final selection of said at least one selected item.

4. The non-transitory computer-readable storage medium of claim 3, wherein said method flirt her comprises:
   indicating said final selection.

5. The non-transitory computer-readable storage medium of claim 1, wherein said accessing comprises:
   receiving a selection of said set of selectable views.

6. A computer implemented method for presenting data within at least one selectable view, said method comprising:
- accessing a set of selectable views for displaying data associated with at least one selected item of an application;
- validating said at least one selected item to achieve at least one validated selected item;
- integrating said at least one validated selected item into at least one selectable view of said set of selectable views to achieve at least one integrated selectable view;
- displaying said at least one integrated selectable view in response to an initial portion of a search, wherein said displaying said at least one integrated selectable view comprises displaying at least one selected item to achieve at least one displayed item, and wherein said accessing, in a single selection mode, comprises:
  - when a first item, of said at least one displayed item, is selected from a first selectable view of said set of selectable views; and
  - when a second item, of said at least one displayed item, is selected from a second selectable view of said set of selectable views, then determining that said second item is said at least one selected item; and
- after said initial portion of said search is terminated, and in response to a resumed portion of said search, displaying said second item in said second selectable view.

7. A non-transitory computer-readable storage medium having instructions embodied therein, that when executed, cause a computer system to perform a method for presenting data within at least one selectable view, said method comprising:
- accessing a set of selectable views, wherein each selectable view of said set of selectable views is configured for displaying data associated with at least one selected item of an application;
- rendering at least one integrated selectable view, wherein said rendering comprises integrating said at least one selected item into at least one selectable view of said set of selectable views;
- displaying said at least one integrated selectable view in response to an initial portion of a search, wherein said displaying said at least one integrated selectable view comprises displaying at least one selected item to achieve at least one displayed item, and wherein said accessing, in a single selection mode, comprises:
  - when a first item, of said at least one displayed item, is selected from a first selectable view of said set of selectable views; and
  - when said first item is selected from a second selectable view of said set of selectable views, then determining that said first item selected from said second selectable view is said at least one selected item; and
- after said initial portion of said search is terminated, and in response to a resumed portion of said search, displaying said first item in said second selectable view.

8. A non-transitory computer-readable storage medium having instructions embodied therein, that when executed, cause a computer system to perform a method for presenting data within at least one selectable view, said method comprising:
- accessing a set of selectable views, wherein each selectable view of said set of selectable views is configured for displaying data associated with at least one selected item of an application;
- rendering at least one integrated selectable view, wherein said rendering comprises integrating said at least one selected item into at least one selectable view of said set of selectable views;
- displaying said at least one integrated selectable view in response to an initial portion of a search, wherein said displaying said at least one integrated selectable view comprises displaying at least one selected item to achieve at least one displayed item, and wherein said accessing, in a multi selection mode, comprises:
  - when a first item, of said at least one displayed item, is selected from a first selectable view of said set of selectable views; and
  - when a second item, of said at least one displayed item, is selected from a second selectable view of said set of selectable views, then determining that said first item selected from said first selectable view and said second item selected from said second selectable view are said at least one selected item; and
- after said initial portion of said search is terminated, and in response to a resumed portion of said search, displaying said first item in said first selectable view, and displaying said second item in said second selectable view.

9. A non-transitory computer-readable storage medium having instructions embodied therein, that when executed; cause a computer system to perform a method for presenting data within at least one selectable view, said method comprising:
- accessing a set of selectable views, wherein each selectable view of said set of selectable views is configured for displaying data associated with at least one selected item of an application;
- rendering at least one integrated selectable view, wherein said rendering comprises integrating said at least one selected item into at least one selectable view of said set of selectable views;
- displaying said at least one integrated selectable view in response to an initial portion of a search, wherein said displaying said at least one integrated selectable view comprises displaying at least one selected item to achieve at least one displayed item, and wherein said accessing, in a multi selection mode, comprises:
  - when a first item, of said at least one displayed item, is selected from a first selectable view of said set of selectable views;
  - when a second item, of said at least one displayed item, is selected from a second selectable view of said set of selectable views; and
  - when said first item and a third item, of said at least one displayed item, are selected from a third selectable view of said set of selectable views, then determining that said first item selected from said third selectable view, said second item selected from said second selectable view, and said third item selected from said third selectable view are said at least one selected item; and
- after said initial portion of said search is terminated, and in response to a resumed portion of said search, displaying said first item in said third selectable view, displaying said second item in said second selectable view, and displaying said third item in said third selectable view.

10. A computer-implemented method for presenting data within at least one selectable view, said method comprising:
- accessing a set of selectable views for displaying data associated with at least one selected item of an application;
- validating said at least one selected item to achieve at least one validated selected item;
- integrating said at least one validated selected item into at least one selectable view of said set of selectable views to achieve at least one integrated selectable view;
- displaying said at least one integrated selectable view in response to an initial portion of a search, wherein said displaying said at least one integrated selectable view comprises displaying at least one selected item to achieve at least one displayed item, and wherein said accessing, in a single selection mode, comprises:
  - when a first item; of said at least one displayed item, is selected from a first selectable view of said set of selectable views; and
  - when said first item is selected from a second selectable view of said set of selectable views, then determining that said first item selected from said second selectable view is said at least one selected item; and
- after said initial portion of said search is terminated, and in response to a resumed portion of said search, displaying said first item in said second selectable view.

11. A computer-implemented method for presenting data within at least one selectable view, said method comprising:
- accessing a set of selectable views for displaying data associated with at least one selected item of an application;
- validating said at least one selected item to achieve at least one validated selected item;
- integrating said at least one validated selected item into at least one selectable view of said set of selectable views to achieve at least one integrated selectable view;
- displaying said at least one integrated selectable view in response to an initial portion of a search, wherein said displaying said at least one integrated selectable view comprises displaying at least one selected item to achieve at least one displayed item, and wherein said accessing, in a multi selection mode, comprises:
  - when a first item, of said at least one displayed item, is selected from a first selectable view of said set of selectable views; and
  - when a second item, of said at least one displayed item, is selected from a second selectable view of said set of selectable views, then determining that said first item selected from said first selectable view and said second item selected from said second selectable view are said at least one selected item; and
- after said initial portion of said search is terminated, and in response to a resumed portion of said search, displaying said first item in said first selectable view and displaying said second item in said second selectable view.

12. A computer implemented method for presenting data within at least one selectable view, said method comprising:
- accessing a set of selectable views for displaying data associated with at least one selected item of an application;
- validating said at least one selected item to achieve at least one validated selected item;
- integrating said at least one validated selected item into at least one selectable view of said set of selectable views to achieve at least one integrated selectable view;
- displaying said at least one integrated selectable view in response to an initial portion of a search, wherein said displaying said at least one integrated selectable view comprises displaying at least one selected item to achieve at least one displayed item, and wherein said accessing, in a multi selection mode, comprises:
  - when a first item, of said at least one displayed item, is selected from a first selectable view of said set of selectable views;
  - when a second item, of said at least one displayed item, is selected from a second selectable view of said set of selectable views; and
  - when said first item and a third item, of said at least one displayed item, are selected from a third selectable view of said set of selectable views, then determining that said first item selected from said third selectable view, said second item selected from said second selectable view, and said third item selected from said third selectable view are said at least one selected item; and
- after said initial portion of said search is terminated, and in response to a resumed portion of said search displaying said first item in said third selectable view, displaying said second item in said second selectable view, and displaying said third item in said third selectable view.

* * * * *